United States Patent
Yang et al.

(10) Patent No.: US 11,500,884 B2
(45) Date of Patent: Nov. 15, 2022

(54) SEARCH AND RANKING OF RECORDS ACROSS DIFFERENT DATABASES

(71) Applicant: Ancestry.com Operations Inc., Lehi, UT (US)

(72) Inventors: Yingrui Yang, San Mateo, CA (US); Fengjie Alex Li, San Jose, CA (US); Gann Bierner, Oakland, CA (US)

(73) Assignee: Ancestry.com Operations Inc., Lehi, UT (US)

( * ) Notice: Subject to any disclaimer, the term of this patent is extended or adjusted under 35 U.S.C. 154(b) by 172 days.

(21) Appl. No.: 16/779,082

(22) Filed: Jan. 31, 2020

(65) Prior Publication Data
US 2020/0250197 A1    Aug. 6, 2020

Related U.S. Application Data (60) Provisional application No. 62/800,106, filed on Feb. 1, 2019.

(51) Int. Cl.
*G06F 7/00*    (2006.01)
*G06F 16/2457*    (2019.01)
(Continued)

(52) U.S. Cl.
CPC ...... *G06F 16/24578* (2019.01); *G06F 16/248* (2019.01); *G06F 16/2468* (2019.01);
(Continued)

(58) Field of Classification Search
CPC ........... G06F 16/24578; G06F 16/2468; G06F 16/248; G06N 20/10; G06N 5/003; G06K 9/6256
See application file for complete search history.

(56) References Cited

U.S. PATENT DOCUMENTS 6,862,559 B1    3/2005    Hogg
7,801,832 B2 *    9/2010    Balogh ............... G06Q 50/18
                                                              707/758
(Continued)

FOREIGN PATENT DOCUMENTS

KR    10-20060050397 A    5/2006
WO    WO-2017/075017 A1    5/2017
WO    WO-2018/226694 A1    12/2018

OTHER PUBLICATIONS

Academic Benchmark, "Domain: Learning to Rank," n.d., 3 pages [Online] [Retrieved Sep. 3, 2019], Retrieved from the internet <URL: http://www.bigdatalab.ac.cn/benchmark/bm/Domain?domain=Learning%20to%20Ra-nk>.
(Continued)

*Primary Examiner* — Mohammad A Sana
(74) *Attorney, Agent, or Firm* — Fenwick & West LLP (57) ABSTRACT

A search system performs a federated search across multiple databases and generates a ranked combined list of found genealogical records. The system receives a user query with one or more specified characteristics. The system may determine expanded characteristics derived from the specified characteristics. The system searches the various databases with the characteristics retrieving records according to the characteristics. The system combines the retrieved records and ranks them using a machine learning model. The machine learning model is configured to assign a weight to the records returned from each of the genealogical databases based on the characteristics specified in the user query. The machine learning model may be trained by any combination of one or more of: a Nelder-Mead method, a coordinate ascent method, and a simulated annealing method. The ranked combined results are provided in response to the user query.

17 Claims, 6 Drawing Sheets

(51) Int. Cl.
G06F 16/248 (2019.01)
G06N 5/00 (2006.01)
G06N 20/10 (2019.01)
G06K 9/62 (2022.01)
G06F 16/2458 (2019.01)

(52) U.S. Cl.
CPC ........... *G06K 9/6256* (2013.01); *G06N 5/003* (2013.01); *G06N 20/10* (2019.01)

(56) References Cited

U.S. PATENT DOCUMENTS

| | | | |
|---|---|---|---|
| 8,166,026 | B1 | 4/2012 | Sadler |
| 2002/0042793 | A1 | 4/2002 | Choi |
| 2002/0099536 | A1 | 7/2002 | Bordner et al. |
| 2004/0083226 | A1 | 4/2004 | Eaton |
| 2005/0125433 | A1 | 6/2005 | Akaboshi |
| 2007/0198597 | A1 | 8/2007 | Betz et al. |
| 2008/0270431 | A1* | 10/2008 | Garbero ................. G06F 16/90 |
| 2011/0010371 | A1 | 1/2011 | Xu et al. |
| 2011/0106819 | A1 | 5/2011 | Brown et al. |
| 2011/0153615 | A1 | 6/2011 | Mizuguchi et al. |
| 2011/0252028 | A1* | 10/2011 | Jensen .............. G06F 16/24578 707/769 |
| 2012/0158702 | A1 | 6/2012 | Kumar et al. |
| 2012/0197882 | A1 | 8/2012 | Jensen |
| 2012/0226559 | A1 | 9/2012 | Baum et al. |
| 2013/0110824 | A1 | 5/2013 | DeRose et al. |
| 2014/0006433 | A1 | 1/2014 | Hon et al. |
| 2014/0188768 | A1 | 7/2014 | Bonissone et al. |
| 2016/0162785 | A1 | 6/2016 | Grobman |
| 2016/0216857 | A1 | 7/2016 | Hulet et al. |
| 2017/0017752 | A1 | 1/2017 | Noto et al. |
| 2017/0188101 | A1 | 6/2017 | Srinivasaraghavan |
| 2017/0213127 | A1* | 7/2017 | Duncan ................. G16B 50/30 |
| 2018/0025087 | A1 | 1/2018 | Kalyanaraman |
| 2018/0226694 | A1 | 12/2018 | Kloos |
| 2019/0043127 | A1* | 2/2019 | Mahapatra ........... G06N 3/0445 |
| 2020/0184382 | A1* | 6/2020 | Fishkov ................. G06N 5/003 |

OTHER PUBLICATIONS

Agrawal, R. et al., "Diversifying search results," Proceedings of the second ACM international conference on web search and data mining, ACM, 2009, pp. 5-14. ACM.

Anagnostopoulos, A. et al., "Sampling search-engine results," World Wide Web, 2006, vol. 9, No. 4, pp. 397-429.

Burges, C., et al., "Learning to rank using gradient descent," Proceedings of the 22nd International Conference on Machine learning (ICML-05), 2005, pp. 89-96 . . . .

Cao, Y. et al., "Adapting ranking SVM to document retrieval," Proceedings of the 29th annual international ACM SIGIR conference on Research and development in information retrieval, 2006, pp. 186-193.

Cao, Z. et al., "Learning to rank: from pairwise approach to listwise approach," Proceedings of the 24th international conference on Machine learning, Jun. 2007, pp. 129-136.

Carbonell, J.G. et al., "The use of MMR, diversity-based reranking for reordering documents and Droducina summaries," SIGIR, 1998, vol. 98, DD. 335-336.

Chang, C.C. et al., "LIBSVM: A library for support vector machines. ACM Transactions on Intelligent Systems and Technology," http:// www. csie. ntu. edu. tw/~ cjlin/libsvm, 2011, vol. 2, No. 3, Accessed Jan. 21, 2020, 5 pages.

Chapelle, O. et al., "Expected reciprocal rank for graded relevance," Proceedings of the 18th ACM conference on Information and knowledge management, ACM, 2009, pp. 621-630.

Chapelle, O. et al., "Intent-based diversification of web search results: metrics and algorithms," Information Retrieval, 2011, vol. 14, No. 6, pp. 572-592.

Clarke, C. L. et al., "Overview of the tree 2009 web track," Waterloo Univ (Ontario), 2009, 10 pages.

Clarke, C.L. et al., "A comparative analysis of cascade measures for novelty and diversity." Proceedings of the fourth ACM international conference on Web search and data mining, ACM, 2011, pp. 75-84.

Clarke, C.L. et al., "Novelty and diversity in information retrieval evaluation." Proceedings of the 31st annual international ACM SIGIR conference on Research and development in information retrieval, ACM, 2008, pp. 659-666.

Cortes, C. et al., "Support-vector networks," Machine learning, 1995, vol. 20, No. 3, pp. 273-297.

Cossock, D. et al., "Subset Ranking Using Regression," Proceedings of the 19th Annual Conference on Learning Theory (COLT'06), 2006, Springer-Verlag, Berlin, Heidelberg, pp. 605—619.

Drosou, M. et al., "Search result diversification." SIGMOD record, 2010, vol. 39, No. 1, pp. 41-47.

Freund, Y. et al., "An efficient boosting algorithm for combining preferences," Journal of machine learning research, Nov. 2003, vol. 4, 933-969.

Giannopoulos, G. et al., "Diversifying user comments on news articles," International Conference on Web Information Systems Engineering, 2012. pp. 100-113.

Guan, F. et al., "ICTNET at Federated Web Search Track 2013," TREC, 2014, 5 pages.

Hawking, D. et al., "Overview of the TREC 2003 Web Track," TREC 2003 Web Track, Mar. 22, 2004, 15 pages.

Hersh, W. et al., "OHSUMED: an interactive retrieval evaluation and new large test collection for research," SIGIR'94, 1994, pp. 192-201.

Ho, T. K., "Random decision forests," Proceedings of 3rd international conference on document analysis and recognition, IEEE, 1995, vol. 1, pp. 278-282.

Jain, V. et al., "Learning to re-rank: query-dependent image re-ranking using click data," Proceedings of the 20th international conference on World wide web, ACM, 2011, pp. 277-286.

Joachims, T., "Optimizing search engines using clickthrough data," Proceedings of the eighth ACM SIGKDD international conference on Knowledge discovery and data mining, ACM, 2002, pp. 133-142.

Karimzadehgan, M. et al., "A stochastic learning-to-rank algorithm and its application to contextual advertising," Proceedings of the 20th international conference on World wide web, ACM, 2011, pp. 377-386.

Krestel, R. et al., "Reranking web search results for diversity," Information retrieval, 2012, vol. 15, No. 5, pp. 458-477.

Larkey, L.S. et al., "Collection Selection and Results Merging with Topically Organized U. S. Patents and TREC Data," Proceedings of the Ninth International Conference on Information and Knowledge Management (CIKM '00), Nov. 2000, ACM, New York, NY, USA, 9 pages.

Li, H., "A short introduction to learning to rank." IEICE Transactions on Information and Systems, 2011, vol. 94, No. 10, pp. 1854-1862.

Li, P. et al., "McRank: Learning to rank using multiple classification and gradient boosting," Advances in neural information processing systems, 2008, pp. 897-904.

Lillis, D. et al., "ProbFuse: A Probabilistic Approach to Data Fusion," Proceedings of the 29th annual international ACM SIGIR conference on Research and development in information retrieval— SIGIR , 2006, 8 pages.

Liu, T.Y., "Learning to rank for information retrieval," Foundations and Trends.RTM. in Information Retrieval, 2009, vol. 3, No. 3, 36 pages.

Lv, Y. et al. "Learning to model relatedness for news recommendation," Proceedings of the 20th international conference on World wide web, ACM, 2011, pp. 57-66.

McKinnon, K., "Convergence of the Nelder—Mead Simplex Method to a Nonstationary Point," SIAM Journal on Optimization, Jan. 1998, vol. 9, No. 1, 11 pages.

Metzler, D. et al., "Linear feature-based models for information retrieval." Information Retrieval, 2007, vol. 10, No. 3 pp. 257-274.

(56) References Cited

OTHER PUBLICATIONS

Palakodety, S. et al. "Query Transformations for Result Merging," Carnegie-Mellon University Pittsburgh School of Computer Science, 2014, 6 pages.

PCT International Search Report & Written Opinion, International Application No. PCT/US2018/036058, dated Sep. 20, 2018, 14 Pages.

PCT International Search Report & Written Opinion, International Application No. PCT/US2018/046320, dated Jan. 30, 2019, 16 Pages.

PCT International Notification of Transmittal of the International Search Report and Written Opinion, PCT International Patent Application No. PCT/IB2020/050814, dated Jan. 31, 2020, 11 pages.

Powell, A. et al., "The Impact of Database Selection on Distributed Searching," Proceedings of the 23rd Annual International ACM SIGIR Conference on Research and Development in Information Retrieval, 2000, ACM, New York, NY, USA, pp. 232—239.

Powell, M.J.D, "On search directions for minimization algorithms," Mathematical Programming, 1973, vol. 4, No. 1, pp. 193-201.

Radlinski, F. et al., "Improving personalized web search using result diversification," Proceedings of the 29th annual international ACM SIGIR conference on Research and development in information retrieval, ACM, 2006, pp. 691-692.

Radlinski, F. et al., "Learning diverse rankings with multi-armed bandits," Proceedings of the 25th international conference on Machine learning, ACM, 2008, pp. 784-791.

Rafiei, D. et al., "Diversifying web search results," Proceedings of the 19th international conference on World wide web, ACM, 2010, pp. 781-790.

Sakai, T. et al., "Evaluating diversified search results using per-intent graded relevance," Proceedings of the 34th international ACM SIGIR conference on Research and development in Information Retrieval, ACM, 2011, pp. 1043-1052.

Sheldon, D. etl al., "LambdaMerge: Merging the Results of Query Reformulations," Proceedings of the Fourth ACM International Conference on Web Search and Data Mining (WSDM '11), Feb. 2011, ACM, New York, NY, USA, 10 pages.

Shokouhi, M. et al., "Robust result merging using sample-based score estimates," ACM Transactions on Information Systems, May 2009, vol. 27, No. 3, 29 pages.

Si, L. et al., "Using Sampled Data and Regression to Merge Search Engine Results," Proceedings of the 25th annual international ACM SIGIR conference on Research and development in information retrieval, 2002, vol. 8, 8 pages.

Tagami, Y., et al., "Ctr prediction for contextual advertising: Learning-to-rank approach," Proceedings of the Seventh International Workshop on Data Mining for Online Advertising, ACM, 2013, 8 pages.

Tax N. et al., "A cross-benchmark comparison of 87 learning to rank methods," Information processing & management, 2015, vol. 51, No. 6, pp. 757-772.

Taylor, M.J.G et al., "Softrank: optimizing non-smooth rank metrics," Proceedings of the 2008 International Conference on Web Search and Data Mining, ACM, 2008 pp. 77-86.

Van Zwol, R. et al., "Diversifying image search with user generated content," Proceedings of the 1st ACM international conference on Multimedia information retrieval, ACM, 2008, pp. 67-74.

Vandenberg, C. et al., "The Lemur Project-Wiki-Rank Lib.," 2013, Accessed at <http://sourceforge.net/p/lemur/wiki/RankLib.>>, Accessed on Jan. 21, 2020, 2 pages.

Vargas. S. el al., "Rank and relevance in novelty and diversity metrics for recorrrn,lender systems," Proceeedings of the fifth ACM conference on Recommender systems. ACM, 2011, pp. 109-116.

Vogt, C.C. et al., "Fusion via a Linear Combination of Scores," Information Retrieval, 1999, vol. 1, pp. 151-173.

Walker, S. H. et al., "Estimation of the probability of an event as a function of several independent variables." Biometrika 1967, vol. 54, No. 1-2, pp. 167-179.

Wang, X et al . . . "Evaluating search result diversity using intent hierarchies," Proceedings of tile 39th International ACM SIGIR conference on Research and Development in Information Retrieval, ACM, 2016, pp. 415-424.

Wikipedia, "Coordinate Descent," Last edited Jul. 24, 2019, 5 pages [Online] [Retrieved Sep. 3, 2019], Retrieved from the internet <URL: https://en.wikipedia.org/wiki/Coordinate_descent>.

Wikipedia, "Discounted cumulative gain," Last edited Aug. 23, 2019, 5 pages [Online] [Retrieved Sep. 3, 2019], Retrieved from the internet <URL: https://en.wikipedia.org/wiki/Discounted_cumulative_gain>.

Wikipedia, "Learning to Rank," Last edited Jul. 3, 2019, 11 pages [Online] [Retrieved Sep. 3, 2019], Retrieved from the internet <URL: https://en.wikipedia.org/wiki/Learning_to_rank>.

Wu, Q. et al., "Adapting boosting for information retrieval measures," Information Retrieval, 2010, vol. 13, No. 3, pp. 254-270.

Wu. S. et al., "Search result diversification via data fusion," Proceedings of the 37th international ACM SIGIR conference on Research & development in information retrieval. ACM, 2014, pp. 827-830.

Xu, J. et al., "Adarank: a boosting algorithm for information retrieval," Proceedings of the 30th annual international ACM SIGIR conference on Research and development in information retrieval, ACM, 2007, pp. 391-398.

Yu, J. et al., "Learning to rank using user clicks and visual features for image retrieval," IEEE transactions on cybernetics, 2014, vol. 45, No. 4, pp. 767-779.

Zhai, C. et al., "Beyond independent relevance: methods and evaluation metrics for subtopic retrieval," ACM SIGIR Forum. ACM, 2015, vol. 49. No. 1, pp. 2-9.

European Patent Office, Extended European Search Report and Opinion, EP Patent Application No. 20748977.4, dated Sep. 15, 2022, seven pages.

* cited by examiner

```
┌─────────────────────────────────────────────────────────────┐
│  Access a training dataset comprising a plurality of        │
│                    historical search results                │
│                             410                             │
└─────────────────────────────────────────────────────────────┘
                              │
                              ▼
┌─────────────────────────────────────────────────────────────┐
│        Sample a subset of the historical search results     │
│                             420                             │
└─────────────────────────────────────────────────────────────┘
                              │
                              ▼
┌─────────────────────────────────────────────────────────────┐
│  Train, using the subset of historical search results, an   │
│  initial classifier that generates weights for the          │
│  plurality of genealogical databases                        │
│                             430                             │
└─────────────────────────────────────────────────────────────┘
                              │
                              ▼
┌─────────────────────────────────────────────────────────────┐
│  Train a ranking model configured to rank genealogical      │
│  records retrieved from the plurality of genealogical       │
│  databases                                                  │
│                             440                             │
└─────────────────────────────────────────────────────────────┘
```

SEARCH AND RANKING OF RECORDS ACROSS DIFFERENT DATABASES

CROSS REFERENCE TO RELATED APPLICATIONS

This application claims benefit of and priority to U.S. Provisional Application No. 65/800,106 filed on Feb. 1, 2019, which is incorporated by reference for all purposes. This application also incorporates by reference PCT Application No. PCT/US2018/036058 filed on Jun. 5, 2018, for all purposes.

BACKGROUND

A genealogical data source may provide its customers with genealogical content from a wide variety of sources, including vital records such as birth and death certificates, census records, court records, probate records, and more. Searching such a diverse set of content faces a number of challenges. For one thing, the type of data available in each source and its relevance to the query can vary greatly. For example, a married name is not valuable at all in birth records, may contain some value in census records (depending on the age of the person when the census was taken), and may be quite valuable in death records. Quantity of data can also vary—census collections may be rich in information about a person's relatives whereas a military record may contain no relative information at all. A disparity in record size can make equitably scoring results difficult. Finally, inexact matching of the query to source records is important: e.g. missing data like married names sometimes which must be inferred, under specified or slightly different date information, nearby or more-generally specified places, and phonetically similar or misspelled names.

All this makes it particularly challenging for a search system to score records from such a diverse set of content. The desired outcome is that the best possible results, from our customers' point of view, are returned first while maintaining a satisfyingly rich variety of result types.

SUMMARY

A search system performs a federated search across multiple databases and generates a ranked combined list of found records. The system receives a user query with one or more specified characteristics. The system may determine expanded characteristics derived from the specified characteristics using a fuzzy operation. The system searches the databases with the characteristics retrieving records according to the enhanced query including the specified characteristics and/or the expanded characteristics. The system combines the retrieved records and ranks them using a machine learning model. The machine learning model is configured to assign a weight to the records returned from each of the databases based on the characteristics specified in the user query. The ranked combined results are provided in response to the user query. In one or more embodiments, the search system searches for genealogical records, wherein the databases may include a plurality of genealogical databases.

The machine learning model has a performance function that is based on a weighted linear combination of the plurality of databases. The machine learning model may be trained with a training dataset. The training dataset comprises a plurality of historical search results, wherein each historical search result comprises a historical user query and historical user actions associated with the records found based on the historical user query. The user interaction allows for learning of pre-specified measures such as relevance between retrieved records and characteristics specified in the user query and also the relevance of particular databases to different characteristics. The machine learning model may be trained by one or more optimization algorithms including, but not limited to, a Nelder-Mead method, a coordinate ascent method, and a simulated annealing method.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A search system implements a machine learning model to rank records retrieved from a plurality of databases. The search system includes a search phase and a ranking phase. In the search phase, the search system receives a user query and conducts searches across the databases. The databases may store records of varying types. In the ranking phase, the machine learning model is implemented to rank the retrieved records trained to rank the models with a training dataset of historical searches. Each historical search may include a user query and a list of records retrieved. The historical search may also include user interaction data with one or more of the records presented in response to the user query.

In one implementation of the search system, the search system searches for genealogical records to help people better discover their family history. Numerous historical records have been digitized, indexed, and placed online in various databases. Record data in databases may include birth records, death records, marriage records, adoption records, census records, obituary records, etc. Other example databases may include the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and other types of databases storing genealogical records. The search system aims to return records of the highest relevance to a user provided query. Improved search capabilities allow for users to more efficiently discover information of interest, e.g., their family history in the case of genealogical records. Although some of the description relates to searching for genealogical records from genealogical databases, the search system can more generally search for various other types of records on other types of databases.

Search System

Figure 1:
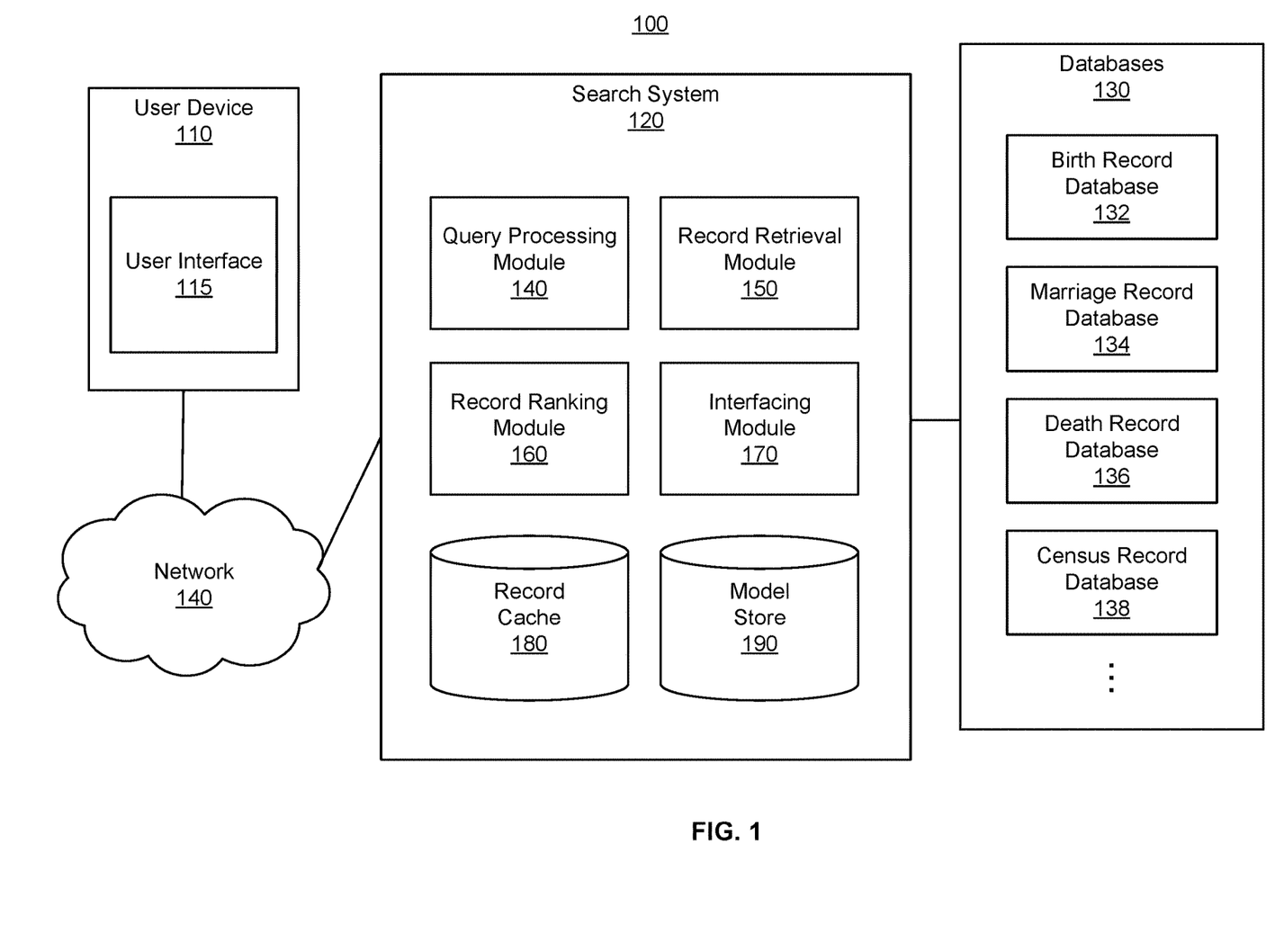
FIG. 1 illustrates a search system environment, in accordance with one or more embodiments.

FIG. 1 illustrates a search system environment 100, in accordance with one or more embodiments. In the search system environment 100, there may be one or more client devices 110, a search system 120, and databases 130 in communication over a network 140. In accordance with an embodiment, the search system 120 may conduct searches related to genealogical records. While embodiments discussed in this disclosure are illustrated using genealogical records as examples, the search system 120 may conduct searches related to other types of data and records not limited to genealogical or DNA related records. In various embodiments, the search system environment 100 may include additional or fewer components than those listed herein.

The client device 110 receives user queries via the user interface 115 and provides the user queries to the search system 120. The client device 110 is a computing device such as a personal computer, laptop, tablet computer, smartphone, or so on. The client device 110 can communicate with components over the network 140. The client device 110 includes a user interface 115 configured to receive user queries from a user of the client device 110. The user interface 115 may include both input devices and output devices. The input devices can receive the user queries, while the output devices can provide retrieved information in response to the user queries. Example input devices include a keyboard, a mouse, a touchscreen, a microphone, a camera, another device that can receive input, etc. Example output devices include a display screen, a speaker, a printer, etc. In one embodiment, the user interface 115 includes a graphical user interface (GUI) that includes one or more search fields to accept user queries from the end user and that displays searched and ranked results that are provided by the search system 120. The user interface 115 may be a mobile application that is developed by the search system 120 or a website of the search system 120. In some embodiments, the user interface 115 may also include an application programming interface (API). User queries may be formatted as a single character string specifying one or more characteristics. In other embodiments, user queries may be formatted to include multiple character strings provided via the one or more search fields. For example, one search field is configured to input a date range while another search filed is configured to input a family name (also referred to as a last name).

The search system 120 searches for records based on user queries received from the client device 110 and provides the queried records to the client device 110. The search system 120 may a general computing device comprising modules and data stores. In an exemplary embodiment, the search system 120 includes a query processing module 140, a record retrieval module 150, a record ranking module 160, an interfacing module 170, a record cache 180, and a model store 190. The search system 120 may comprise additional, fewer, or different components than those listed herein.

The query processing module 140 processes a user query to generate an enhanced query including one or more expanded characteristics. The query processing module 140 identifies specified characteristics in the user query. This may be done for example by identifying different types of information (names, dates, locations, etc.) included in the user query. For example, in a user query of "Jane Doe, married to John Doe on Jul. 23, 1925, in Toronto, Canada", the query processing module 140 may identify specified characteristics of "Jane Doe" and "John Doe" as full names of individuals with the relationship between the two individuals being that the two were "married on Jul. 23, 1925" in the locale of "Toronto, Canada". The query processing module 140 may also expand the user query to create multiple expanded characteristics that are derived from specified characteristics in the user query. For example, the search system 120 may expand a specified string (e.g., an ancestor's name) through a fuzzy operation to generate derivations of the name as the expanded characteristics. Likewise, a specified year of birth may also be expanded to nearby years and a specified location may also be expanded geographically to one or more other regions in proximity of the specified location. Query expansion is further described below in Section entitled "Query Expansion". In some embodiments, the query processing module 140 tailors the enhanced query to a particular database for the search. Tailoring the enhanced query may include filtering out various specified and/or expanded characteristics of less relevance to a particular database. For example, an enhanced query for use in searching the birth record database 132 may be tailored to remove any characteristics pertaining to "death" or other characteristics related to death. The query processing module 140 provides the enhanced query including specified characteristics and/or the expanded characteristics to the record retrieval module 150 for retrieval of related records.

The record retrieval module 150 searches for and retrieves records using the specified characteristics and/or the expanded characteristics. The record retrieval module 150 performs a federated search, which includes searches on a plurality of databases 130. At each database, the record retrieval module 150 searches with an enhanced query including the specified characteristics and/or the expanded characteristics of the user query (provided by the query processing module 140). Each database may return a search result that includes a plurality of records. For example, a birth record database 132 may return a set of birth records based on a specified name in a user query. The same user query may also cause the marriage record database 134 to return another set of marriage records that satisfies the characteristics specified in the user query. Similarly, other record databases, such as the death record database 136 and the census record database 138, may return unique sets of records.

The record ranking module 160 ranks records retrieved from the various databases 130. The record ranking module 160 may use a machine learning model to rank the records across different search results. The machine learning model is trained to assign a weight to the search result returned from each of the databases based on the characteristics (specified and/or expanded) that are indicated in the user query. The combined ranked list may be a weighted combination of individual ranked list of each search result retrieved from a database. The weight of a database is assigned based on the relevance of the database compared to other databases in light of the characteristics specified in the query. For example, when a user query specifies a birth date, the record ranking module 160 may weight records from the birth record database higher than records from other databases.

The machine learning model may be trained with a training dataset that includes a plurality of historical search results that pair user query with the historical user actions and search results. Hence, the machine learning model is trained to determine the relevancy of records from a particular database based on the characteristics. The training of the machine learning model for use in ranking the retrieved records is further described in Section entitled "Ranking Algorithm". After the searched records are ranked, the ranked combined result of records (also referred to as ranked combined records) are provided to the interfacing module 170 for presentation to the client device 110.

The interfacing module 170 provides the ranked combined records to the client device 110. The interfacing module 170 may format the ranked combined records according to specifications of the user interface 115 on the client device 110. For example, in embodiments with the user interface 115 implemented as a GUI, the interfacing module 170 may format each record appropriately for the GUI. The interfacing module 170 also receives user interaction information with the ranked combined records. The client device 110 receives user interaction input interacting with the presented records in response to the user query. The client device 110 provides the user interaction input to the interfacing module 170. The user interaction input may be cached in the record cache 180 for use in training and/or updating the machine learning model used in ranking the results.

The record cache 180 caches records retrieved from the databases 130. Records retrieved form the databases 130 may be cached for subsequent presentation for subsequent user queries. The record cache 180 may also store historical user queries, specified characteristics, expanded characteristics, or any combination thereof. The record cache 180 may associate various items stored in the record cache 180. For example, associations may be defined between characteristics and records retrieved according to those characteristics. Associations may further be weighted according to user interaction input. For example, a first association between a first record interacted with by a user in response to a user query is weighted higher than a second association between a second record retrieved in response to the same user query that was not interacted with by the user.

The model store 190 stores one or more models used by the search system 120. The models may include the machine learning model used to rank and combine records for a particular user query. The models may be updated by the search system 120 as more historical data is collected, i.e., user queries, user interaction input, etc.

The databases 130 store records. The databases 130 may be hosted by external systems. Each database may format the record differently according to the type of record stored. In embodiments with searching for genealogical records, the databases 130 may include one or more genealogical databases, such as the birth record database 132, the marriage record database 134, the death record database 136, the census record database 138, other types of genealogical records databases, etc.

Figure 2:
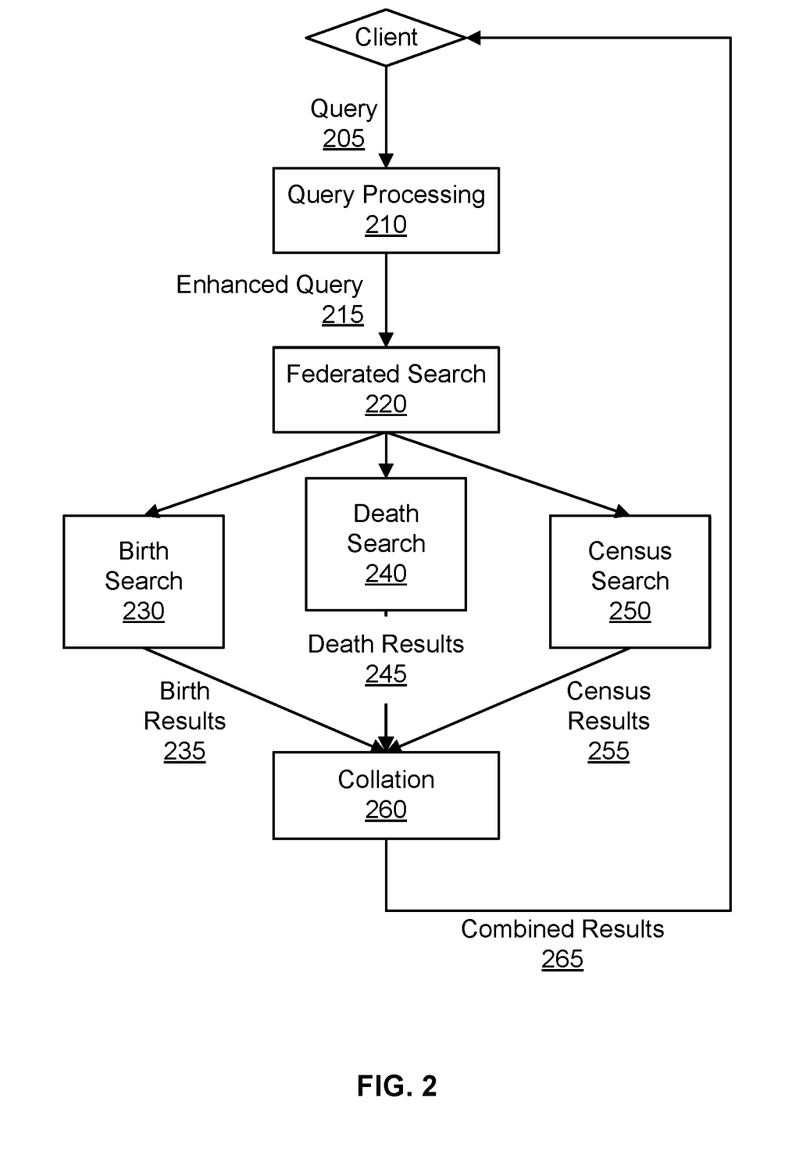
FIG. 2 is an example search and rank process, in accordance with one or more embodiments.

FIG. 2 is an example search and rank process 200, in accordance with one or more embodiments. The process 200 is in the perspective of the various components described in FIG. 1, namely the client device 110, the search system 120, and the databases 130.

The client device 110 provides a user query 205 to the search system 120. The user query 205 may specify one or more genealogical characteristics. The search system 120 processes the user query 205 to determine an enhanced query 210. The enhanced query 210 may include the specified characteristics in addition to expanded characteristics, e.g., via the fuzzy operation. The search system 120 performs the federated search 220, which includes searches on a plurality of genealogical databases. As shown in FIG. 2, there is a birth search 230, a death search 240, and a census search 250. In other embodiments (not shown), there may be a different set of databases searched through. Each genealogical database may return a search result that includes a plurality of genealogical records. For example, a birth record database may return birth results 235 as a set of birth records based on a specified name in the enhanced query, similarly death results 245 including retrieved death records and census results including retrieved census results 255, the records retrieved from the various databases according to the enhanced query. The enhanced query may also cause the marriage record database to return another set of marriage records that satisfies the characteristics specified in the user query.

The search system 120 may collate 260 the search results to generate a combined result 265 that includes different genealogical records retrieved from the various databases. The combined results 265 are arranged in such manner as to optimize global diversity and local diversity. Global diversity referring generally to the variance of record types in the combined results 265, whereas local diversity refers to the variation in positioning of record types in the combined results 265. The combined results 265 are returned to the client device 110.

In one or more embodiments, the search system 120 may use a machine learning model to rank the genealogical records across different search results. The machine learning model is trained to assign a weight to the search result returned from each of the genealogical databases based on the genealogical characteristics that are specified in the user query. The combined ranked list may be a weighted combination of individual ranked list of each search result retrieved from a genealogical database. The weight of a genealogical database is assigned based on the relevance of the database compared to other genealogical databases in light of the genealogical characteristics specified in the query. For example, when a user query specifies a birth date, the birth record database often becomes more relevant than other databases. The machine learning model may be trained based on a training dataset that includes a plurality of historical search results that pair user query with the historical user actions and search results. Hence, the machine learning model is trained to determine the relevancy of records from a particular database based on the genealogical characteristics. After the searched records are ranked, the search system 120 may present the ranked combined result of genealogical records at a user interface.

The search system 120 may use historical search results as the training dataset to train a machine learning model used to rank the searched records. Each of the historical search results may include records of a historical user query and historical user actions associated with searched genealogical records found based on the historical user query. The searched genealogical records in each historical search result were retrieved from the plurality of genealogical databases. Each searched genealogical record may be associated with a relevancy label that is determined based on the historical user action associated with the record with respect to the particular historical user query. In one embodiment, the relevancy label may be binary. In other words, a historical record in a particular historical user query may be labeled as positive if a user took an action (e.g., click, save, print, bookmark, etc.) on the historical record or negative if the user did not take any action. In some embodiments, the relevancy label may more than a binary classification (i.e., a multiclass classification) by distinguishing the types of positive actions or potentially the types of negative actions. Example actions include viewing a record page, viewing an image (in a record), saving a record to a profile, printing a record, saving a record to a local computing system, adding a record to a family tree, and hovering over an icon presented with a record that provides additional detail. Each action may be assigned to a category in the multiclass classification. Since each historical search result in the training dataset may be associated with a particular user query, the search system 120 may assign a plurality of features for a search record in the historical search result. A feature may describe a relationship between the historical user query and the searched genealogical record.

The search system 120 may use the training dataset to train a machine learning model to rank genealogical records using the features assigned to different search records. The machine learning model may propose a weighted linear combination of various genealogical databases given the genealogical characteristics specified in the user queries. The machine learning model may also be associated with an objective function, which measures the performance of the model. The objective function may calculate a performance score that is related to a metric that measures the relevancy of the records in a proposed ranked list discounted by the positions of the records. In one embodiment, the metric may be a normalized discounted cumulative gain (nDCG). A high-performance score measured by the objective function may indicate that the machine learning model successfully ranks the historical records the in a session of user query in a way that is consistent with the historical user actions performed on the historical records. A low performance score measured by the objective function may indicate that the machine learning model may need to adjust the weights assigned to different genealogical databases. The machine learning model may iteratively adjust the proposed weights assigned to different genealogical databases with respect to different user query until the performance score of the objective function no longer improves (e.g., the objective function converges), improves to a satisfactory level, or after a predetermined number of iterations.

In one embodiment, the objective function is a gradient-free function that may be more difficult to achieve convergence or take many iterations to converge. The rate of convergence may be related to the initial state of the machine learning model (e.g., the initial weights assigned to different genealogical databases). In one embodiment, the search system 120 may sample a subset of historical search results from the training dataset. The search system 120 may train, using the subset of historical search results, an initial classifier that generates weights for the plurality of genealogical databases. The initial classifier may be a support vector machine or any other suitable classifiers. The weight output of the initial classifier may be used as the initial weight assignments of a ranking model to speed up the rate of training. In one case, the machine learning model may represent the initial weights of different genealogical databases as a simplex. The vertices of the simplex correspond to the weights. The machine learning model may explore the shape of the simplex by expanding, shrinking, contracting, and reflecting the simplex to minimize the objective function of the model.

Figure 4:
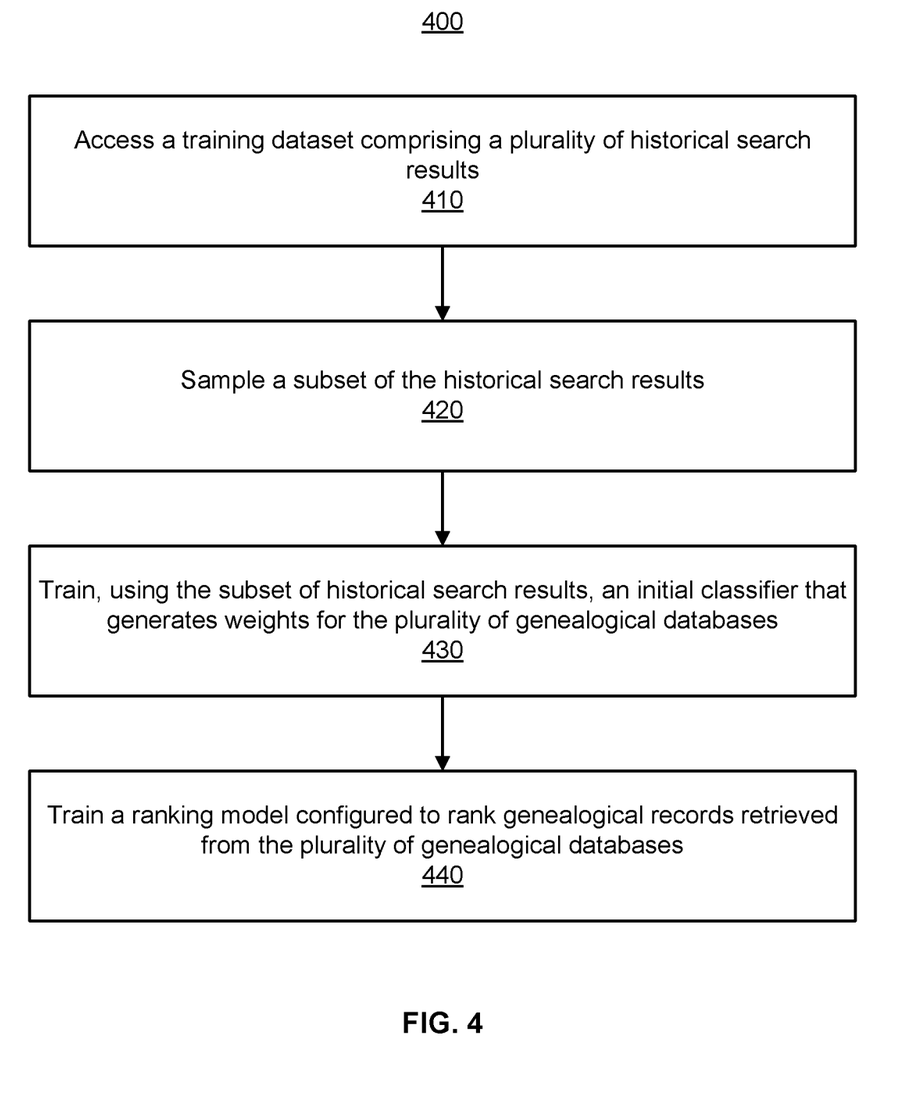
FIG. 4 illustrates a flowchart of training of the machine learning model for ranking, in accordance with one or more embodiments.

FIG. 4 illustrates a process 400 of training of the machine learning model for ranking, in accordance with one or more embodiments. The process 400 is accomplished by the search system 120, including the various components of the search system 120. In one or more other embodiments, the search system 120 trains the machine learning model for ranking of search results retrieved from other types of databases, not limited to genealogical databases.

The search system 120 accesses 410 a training dataset comprising a plurality of historical search results. Each of the historical search results may include records of a historical user query and historical user actions associated with searched genealogical records found based on the historical user query. Each searched genealogical record may be associated with a relevancy label that is determined based on the historical user action associated with the record with respect to the particular historical user query. In one embodiment, the relevancy label may be binary. In another embodiment, the relevancy label may be non-binary, e.g., multiclass. For example, a click interaction of a record is assigned a score of 3, a print interaction of a record is assigned a score of 8, an attach interaction to a family tree has a score of 10, and an absence of any interaction with a record is assigned a score of 0.

The search system 120 samples 420 a subset of historical search results from the training dataset. Sampling may be random. In other embodiments, sampling includes removal of historical search results without any non-negative interactions.

The search system 120 trains 430, using the subset of historical search results, an initial classifier that generates weights for the plurality of genealogical databases. The initial classifier may be a support vector machine or any other suitable classifiers. The weight output of the initial classifier may be used as the initial weight assignments of a ranking model to speed up the rate of training.

The search system 120 trains 440 the ranking model configured to rank genealogical records retrieved from the plurality of genealogical databases. The ranking model (or more generally referred to as the machine learning model for ranking genealogical records retrieved from a plurality of genealogical databases) includes an objective function that may include a local diversity of the ranking list. The search system 120 trains the ranking model by optimization of the objective function, e.g., via a Nelder-Mead algorithm.

Figure 5:
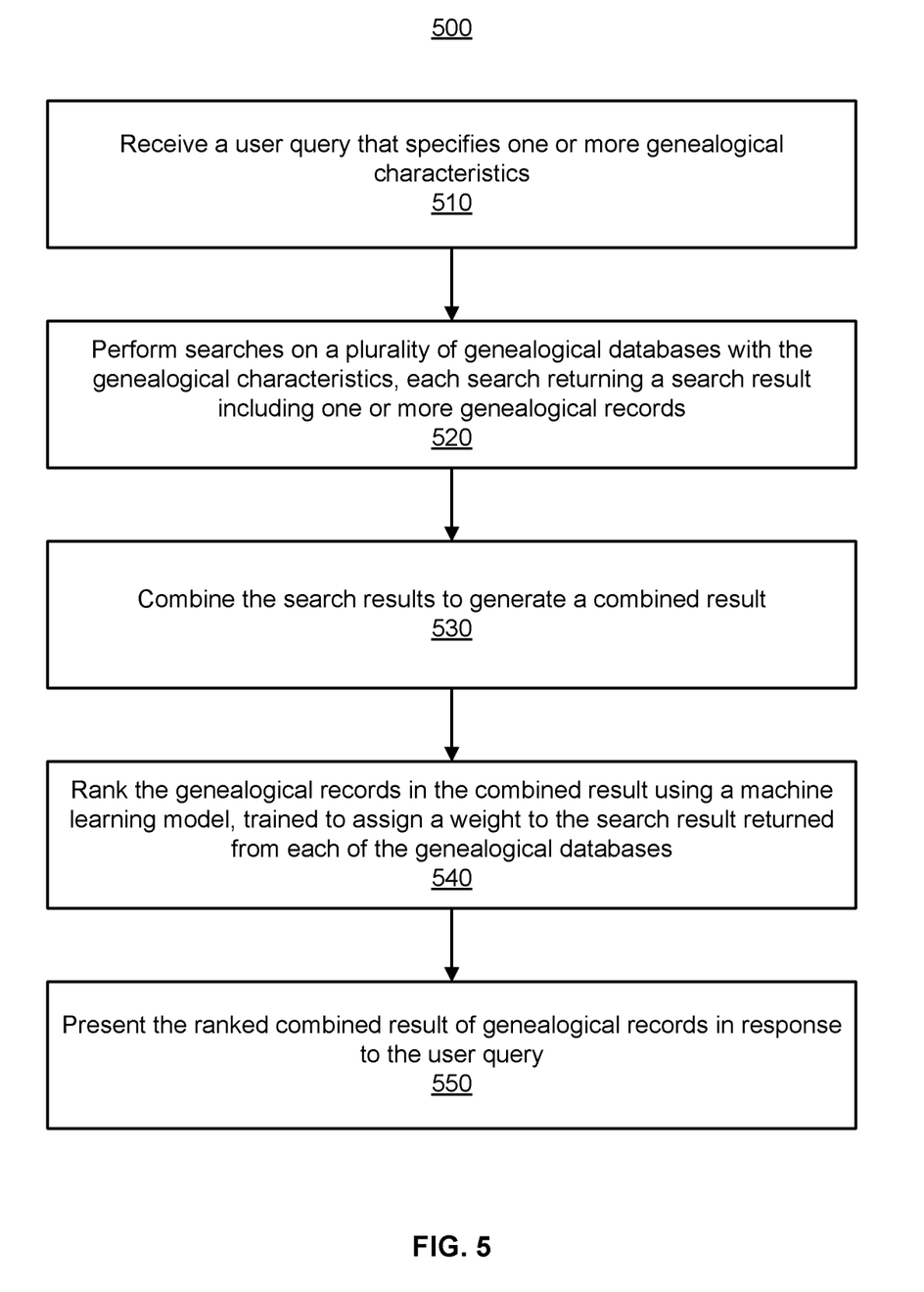
FIG. 5 illustrates a flowchart of implementing the machine learning model for ranking, in accordance with one or more embodiments.

FIG. 5 illustrates a process 500 of implementing the machine learning model for ranking, in accordance with one or more embodiments. The process 400 is accomplished by the search system 120, including the various components of the search system 120. In one or more other embodiments, the search system 120 implements the machine learning model for ranking of search results retrieved from other types of databases, not limited to genealogical databases.

The search system 120 receives 510 a user query specifying one or more genealogical characteristics. The search system 120 may determine expanded genealogical characteristics derived from the specified genealogical characteristics using a fuzzy operation.

The search system 120 performs 520 searches on a plurality of genealogical databases with the genealogical characteristics. Each search returns a search result including one or more genealogical records retrieved from a genealogical database based on the characteristics in the search. The search system 120 may determine tailored queries for each database.

The search system 120 combines 530 the search results to generate a combined result. The search system 120 may include a set number of records retrieved from each database. In other embodiments, the search system 120 combines some or all records from the search results.

The search system 120 ranks 540 the genealogical records in the combined result using a machine learning model. The machine learning model is trained to assign a weight to the search result returned from each of the genealogical databases.

The search system 120 presents 550 the ranked combined result of genealogical records in response to the user query. The search system 120 may format the ranked combined result, e.g., to be in accordance with a display format by a client device 110.

Query Expansion

The query processing module 140 may process a user query by determining expanded characteristics from the user query. User queries, as described above, are typically partial descriptions of a person and may include information like name, gender, relatives, and dates and places for life events (such as birth and death). The desired search results are records in which this person is present. User queries may generally be noisy due to typos or misinformation. Common errors, for example, for a user query to search for a year or two off of the actual year of a birth date, or to mistake a middle name for a first name.

Because of the noise in both the queries and content, a certain amount of fuzziness must be allowed to achieve acceptable recall. A query expansion module translates the facts expressed in the query into a more extensive set of search clauses. The fuzziness expansion can include a calculation of an edit distance, or a number of edits Some example search clauses include names, places, and dates. Names may particularly include, but not limited to, exact names, phonetically similar names, married surnames, distinction between first names, middle names, and family names. Places may particularly include, but not limited to, exact locations, general regions inclusive of the exact locations, and adjacent regions. Dates may particularly include, but not limited to, days, months, years, dates within a threshold error from a specified date, etc.

Consider the query "John Smith born May 1900" and a record "Johnny Smith born 1902", the two first names are phonetically matched, similar, and fuzzily matched within the edit distance of 2. However, the record would not be matched to the query if considering exact name matches. An expanded characteristic of the query may include derivations of the name "John Smith" thus providing for inclusion of the record despite some dissimilarities.

These expansion principles may apply to a variety of life events (birth, death, marriage, residence, etc.) and people (self, spouse, parents, children, etc.), yielding hundreds of potential clause types with different levels of importance. A machine learning may employed wherein search clauses are used as features. Respective weights for the search clauses may be computed via the machine learning model.

Evaluation Metrics for Ranking

The record ranking module 160 uses a diversity metric to measure diversity in the ordered ranking list. The diversity is agnostic of record type, such that there is no preference for a particular record type. For example, there may be many different records come types, such as birth, death, marriage, etc. An optimal diversified ranking list would include coverage over many record types.

In one or more embodiments, a Normalized Cumulative Entropy (NCE) is used by the record ranking module 160 as the diversity metric. NCE measures the diversity of a given ranking list in three steps. At a first step, entropy is calculated for the list of records to be ranked, wherein the entropy describes the global diversity. In one or more implementations, the Shannon entropy formula is used for the entropy calculation. At a second step, a sum of entropy value at each position in the rank is taken, i.e., cumulative entropy. Cumulative entropy describes the local diversity. At a third step, the cumulative entropy at each position is normalized to a maximum cumulative entropy, resulting in a NCE value ranging between 0 to 1. NCE allows for comparison of diversity for ranking lists of different length.

The ideal cumulative entropy is defined as a special maximum entropy problem with an additional constraint that the probability of each record type has to be a special value between 0 and 1 instead of any real values in that range. This problem can be viewed in the perspective of an integer programming maximization problem. U.S. application Ser. No. 16/481,030, filed on Aug. 10, 2018, entitled "Diversity Evaluation in Genealogy Search" is incorporated by reference for all purposes.

NCE could measure not only global diversification, but also local diversification in the ranking list. Global diversification measures how many record types are presented in the list, while local diversification measures whether same or different record types are presented between row to row records. For example, different record types are represented by letters, such as A, B, etc., and $R_1^A$ represents that the first record is of type A. The ranking list $L_1$ of $[R_1^A, R_2^A, R_3^B, R_4^B]$ has better global diversification than ranking list $L_2$ of $[R_1^A, R_2^A, R_3^A, R_4^B]$, as L1 covers two record types while L2 covers only one type. Now given another list $L_3$ of $[R_1^A, R_2^A, R_3^B, R_4^B]$, then there is no difference between $L_1$ and $L_3$ in terms of global diversification. However, $L_3$ has better local diversification than $L_1$, as all adjacent records in L3 have different record types, and checking the top two results in both lists, L3 covers two types while L1 covers only one type.

Ranking Algorithm

The record ranking module 160 trains a machine learning model for ranking records retrieved across the databases 130 using a linear combination model to solve the objective function. The record ranking module 160 solves for optimums of the linear combination model with various optimization algorithms. The objective function has N unknown weights linearly combining multiple ranked lists into one. The objective function is a non-differentiable function. The dimensionality of the objective function is N. In a first embodiment, the record ranking module 160 implements a coordinate ascent algorithm for optimization of the machine learning model. In a second embodiment, the record ranking module 160 implements a stochastic search algorithm for optimization of the machine learning model, namely a Nelder-Mead algorithm integrated with rank support-vector machine algorithm (rankSVM).

Coordinate Ascent (CA) and Customized CA

Coordinate ascent is an optimization algorithm similar to gradient descent. With coordinate ascent, the record ranking module 160 initializes variables randomly for each record retrieved for the user query. Iteratively, the record ranking module 160 updates a variable by a step size along a certain direction that leads to the local minimum or maximum of the objective function. Notably, CA differs from gradient descent in that CA is a derivative-free optimization algorithm. Being derivative-free is beneficial in this record ranking problem, as the objective function is an evaluation metric which could be represented as a non-differentiable function in terms of feature weights.

In additional embodiments, an initialization schema is implemented by the record ranking module 160 to improve optimization efficiency. The record ranking module 160 considers labels in the ranking training data to initialize variables. A feature is initialized as 1 or 0 depending on whether the label is either relevant or irrelevant, respectively. Then when calculating the weighted feature sum as the predictive score for each record, the relevant records will be predicted a higher score than irrelevant ones, therefore be ranked on top of the list. This help increase the objective function, thus speeding up convergence time.

The label-based initialization schema for weights of the features as follows:

$$w = \begin{cases} 0.5, & \text{if } fre_{rel} = 0, fre_{irrel} = 0 \\ \dfrac{fre_{rel}}{fre_{rel} + fre_{irrel}} & \text{otherwise} \end{cases}$$

where $fre_{rel}$ is the number of times for the feature being 1 in relevant records, and $fre_{irrel}$ is the number of times for the feature being 1 in irrelevant records.

TABLE 1

Toy Training Data

| Record | Label | $f_1$ | $f_2$ | $f_3$ | $f_4$ |
|---|---|---|---|---|---|
| $r_1$ | 1 | 1 | 0 | 1 | 0 |
| $r_2$ | 1 | 1 | 0 | 1 | 1 |
| $r_3$ | 0 | 0 | 1 | 1 | 1 |
| $r_4$ | 0 | 0 | 0 | 0 | 0 |

An example of the label-based initialization schema uses data to show how to initialize the weights. Table 1 gives the label and feature values for 4 records, $r_1$, $r_2$, $r_3$, and $r_4$. A label with value 1 means that the record is relevant, and a label with value 0 means that the record is irrelevant. The initialized weight of each feature can be calculated, indicated by $w_{new}$ in Table 2. For example, $f_3$ is 1 in relevant records for 2 times, and is 1 in irrelevant records for 1 time, thus the initial weight is 2/(2+1), which is ⅔. For comparison, weights obtained by default CA would be 1 divided by the number of features, i.e., ¼ for each feature, indicated by $w_{old}$

TABLE 2

Feature Weights

| | $f_1$ | $f_2$ | $f_3$ | $f_4$ |
|---|---|---|---|---|
| $w_{new}$ | 1 | 0 | ⅔ | ½ |
| $w_{old}$ | ¼ | ¼ | ¼ | ¼ |

TABLE 3

Score and Rank

| Record | Label | $s_{new}$ | $s_{old}$ |
|---|---|---|---|
| $r_1$ | 1 | 1.67 | 0.5 |
| $r_2$ | 1 | 2.17 | 0.75 |
| $r_3$ | 0 | 1.17 | 0.75 |
| $r_4$ | 0 | 0 | 0 |

Now the question is whether $w_{new}$ could improve ranking optimization when compared with $w_{old}$. A score is calculated for each record based on its sets of feature weights, from the prior initialization schema and the label-based initialization schema. Specifically, a score is predicted for a record as the linear combination of its features and weights. For example, from Table 1 $r_1$ has features [1, 0, 1, 0], using $w_{new}$ of [1, 0, ⅔, ½], a score of 1.67 is calculated for $r_1$, as 1*1+0*8+1*⅔+0*½=1.67.

Table 3 shows the score for each record. $s_{new}$ and $s_{old}$ stands for the score obtained by customized CA and default CA respectively. $rank_{new}$ is the rank obtained by customized CA. And the label of each record is copied from Table 1. Based on the descending order of the scores in $s_{new}$, customized CA puts both relevant records on top of the list. On contrast, the default CA would predict a lower score to $r_1$ than that of $r_3$, therefore ranking an irrelevant record on top of a relevant one.

Stochastic Search (SS) Using Nelder-Mead

In an example embodiment, the search system 120 may train the machine learning model with a stochastic search algorithm (SS) implementing an initial classifier and a Nelder-Mead algorithm (Downhill Simplex method). The stochastic search algorithm achieves a fast convergence rate compared to other state-of-art algorithms. The Nelder-Mead method is a numerical method to find the optimum of a loss function in multidimensional spaces. In one embodiment, the process may involve a heuristic search method that updates downhill through a multidimensional topology that can converge to non-stationary points. The initial weights play a crucial role in the speed of convergence and also affect how the algorithm accommodates multiple local optimums. The step size of initial weights must be big enough to allow sufficient exploration of the space. Multiple threads with different initialization are standard. In one embodiment, the initial classifier is trained on the training data to learn initial weights using rankSVM. The weights learned are used in initializing the stochastic search algorithm.

The ranking problem is an optimization problem to find the minimum of some loss function L(y,w), where w=[$w_1$, $w_2$, ... $w_N$] is an N dimensional vector representing unknown weights of N ranked lists. y is the target. Each ranked list $R_n$ consists of $d_n$ records with a rank score $s_{ni}$. The combined ranked results returned to users is a linear combination of the ranked lists. the predicted ranked score $\bar{s}_i = \sum_{j=1 \ldots N} w_j s_{ji}$ is used to rank the combined ranked results $\bar{R}$. The loss function is defined as the IR metric calculated based on $\bar{R}$.

To initialize the algorithm, a point $v_0 = [w_{01}, w_{02}, \ldots w_N]$ with a step size E is chosen. The point $v_0$ may be determined with the initial classifier. The initial classifier is trained with the training dataset including historical search queries and search results with the labeled relevancies. The initial simplex of vertices consists of the initial point $v_0$ and j where $v_j = [w_{01}, w_{02}, \ldots w_{0j} + \epsilon \ldots w_{0N}]$, j=1, ... N. Initial value of loss function $\hat{L}_0$ is evaluated at all N+1 vertices. At each iteration, the vertices ($v_k$) are ordered by $\hat{L}(v_k)$, then the parameter space is explored by reflection, expansion, contraction, and shrinkage, exampled in FIG. 3.

Figure 3:
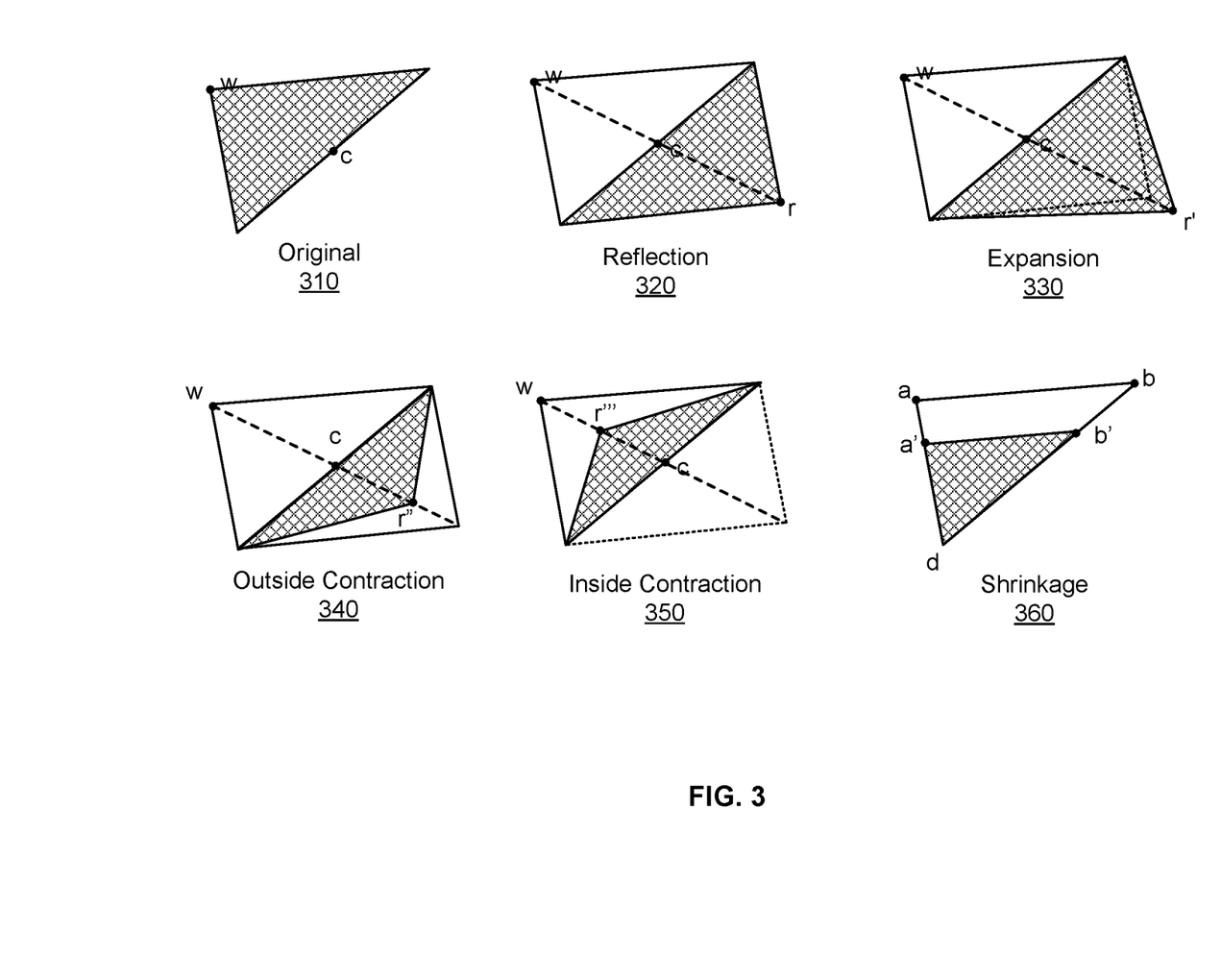
FIG. 3 illustrates the simplex transformations that can be undertaken when converging on the optimum, in accordance with one or more embodiments.

Referring now to FIG. 3, FIG. 3 illustrates the simplex transformations that can be undertaken when converging on the optimum. Original 310 is a simplex prior to transformation. A reflection transformation moves the vertex with highest $\hat{L}(v_k)$ to another point to reduce the loss function, while preserving the volume of the simplex, shown as reflection 320 with vertex w is reflected to vertex r. If the new vertex produces a smaller loss value, the algorithm expands the volume by extending the vertex r to r' shown in expansion 330. If the extended vertex has a bigger loss value, a contraction is attempted in the transverse direction. An outside contraction 340 moves the vertex r towards the point c while keeping c in between w and r". An inside contraction 350 moves the vertex r past the point c such that r''' is now between vertex w and point c. If contraction doesn't yield a smaller loss value, a shrinking transformation will shrink the simplex proportionally in all directions around the best vertex (with optimal loss value). Exampled as shrinkage 360, vertex d is the best vertex such that vertex a and b are multiplied by some fraction yielding vertex a' and b' to shrink the simplex. Nelder-Mead method explores the local area of a parameter combination within each step and updates multiple parameters accordingly in each iteration. One benefit is the prevention of the algorithm from going too greedily towards a local optimal. max_iter determines the maximum number of iterations of the algorithm while max_stagnation determine the maximum number to try when there's no improvement in the loss function. $\delta_{refl}$, $\delta_{ext}$, $\delta_{cont}$ and $\delta_{shr}$ determines the ratio of changes in the operations. $\delta_{refl}=1$ is a standard reflection, $\delta_{ext}$ represents the amount of the expansion; 0 means no expansion. $\delta_{cont}$ is the contraction parameter and should be between 0 and 1. $\delta_{shr}$ is the ratio of shrinkage, should be 0 to 1.

Other approaches may be implemented in the stochastic search algorithm, e.g., to increase stochasticity across iterations. In one or more embodiments, at each iteration, a temperature for the probability of improving the cost function can be calculated based on simulated annealing method. The temperature provides a probability of accepting a simplex transformation. Additional embodiments may include generating a new vertex (e.g., randomly) in substitution of the worst vertex (biggest loss value, i.e., farthest from the global optimum).

Experimental Results

The accuracy of the optimization methods for ranking described above was evaluated on a sample of user search interactions on Ancestry mobile app. Interactions were classified into negative (no interactions) and positive (attach to a family tree). Queries without any non-negative interactions were removed from the training and testing set. In total around 300,000 queries were randomly selected them into three folds of training or testing data. For each user query, an enhanced query was generated based on specific requirements for each record type and around 100 records from each record type were returned based on a record-specific machine learning model. The result of a user query was a merged list from 8 ranked lists each with around 100 records retrieved from record specific queries. The major offline validation metric used for model verification was nDCG@100.

TABLE 4 nDCG@100 on Test Datasets for Different Models

| Method | nDCG@100 |
| --- | --- |
| Baseline | 0.5825 |
| LambdaMART | 0.6250 |
| RankNet | 0.5944 |
| RankBoost | 0.6081 |
| AdaRank | 0.5039 |
| ListNet | 0.6187 |
| RankSVM | 0.7056 |
| SS | 0.7131 |

In Table 4, ranking performance of the federated queries using the stochastic search is compared with other models implemented in RankLib (LambdaMART, RankNet, RankBoost, AdaRank, ListNet) as well as the rankSVM model. The baseline is raw-score combination. The accuracy was evaluated based on nDCG@100. The SS model's objective function was defined according to nDCG@100. The size of the subset used to learn the initial weights of SS is around 1,000 queries. Complex models such as RankNet and AdaRank seemingly suffered from over-fitting. Simple models such as RankSVM were more effective in optimizing nDCG in this case. SS achieved comparable performance as LambdaMART with 1000 trees. Compared to rankSVM, SS had better performance.

Example Computing Device

Figure 6:
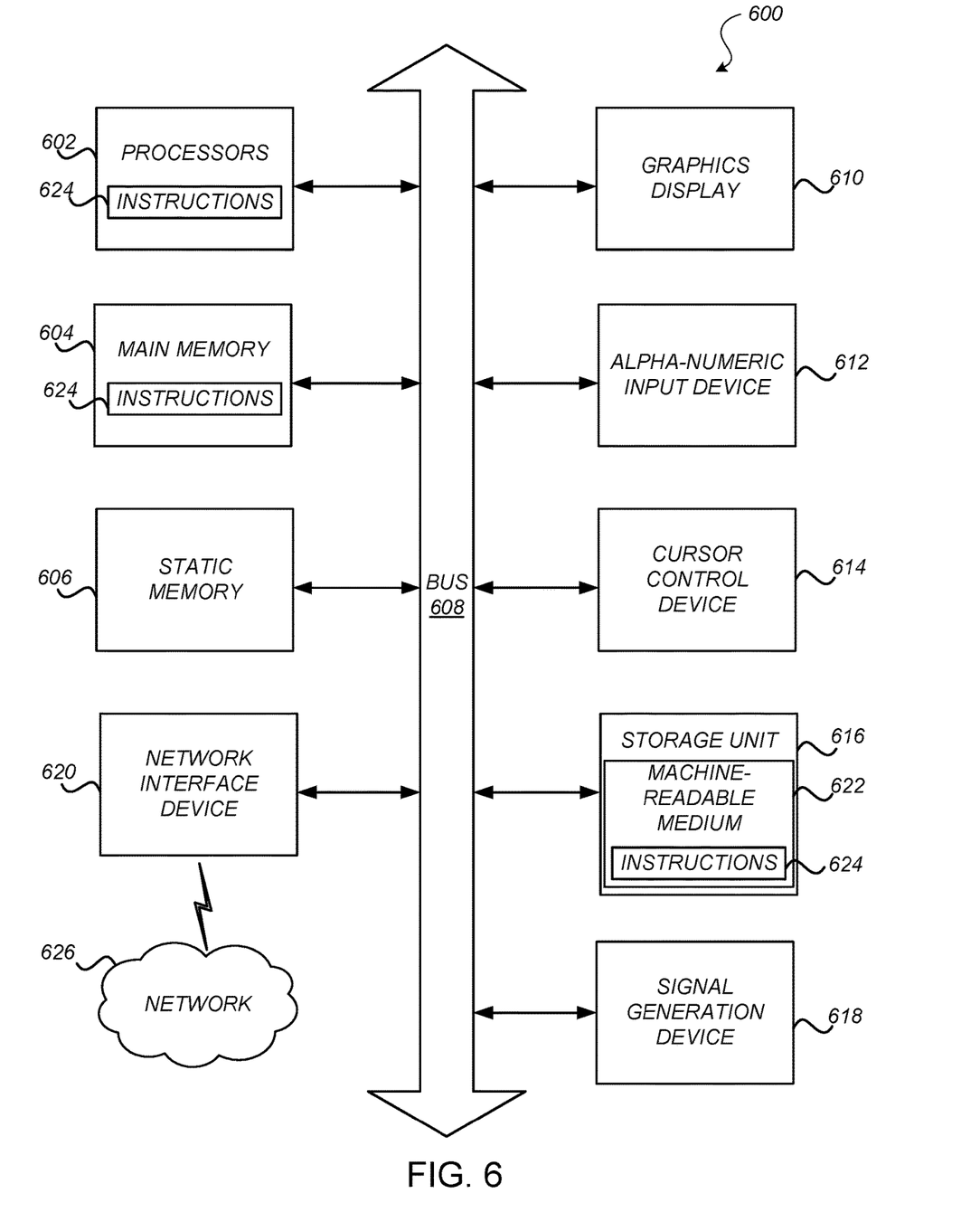
FIG. 6 is a block diagram illustrating components of an example computing machine, in accordance with one or more embodiments.

FIG. 6 is a block diagram illustrating components of an example computing machine that is capable of reading instructions from a computer-readable medium and execute them in a processor (or controller). A computer described herein may include a single computing machine shown in FIG. 6, a virtual machine, a distributed computing system that includes multiples nodes of computing machines shown in FIG. 6, or any other suitable arrangement of computing devices.

By way of example, FIG. 6 shows a diagrammatic representation of a computing machine in the example form of a computer system 600 within which instructions 624 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 6 may correspond to any software, hardware, or combined components shown in FIGS. 1-3, including but not limited to, the client device 110, the computing server 130, and various engines, interfaces, terminals, and machines shown in FIG. 1. While FIG. 6 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an interne of things (IoT) device, a switch or bridge, or any machine capable of executing instructions 624 that specify actions to be taken by that machine. Further, while only a single machine is illustrated, the term "machine" and "computer" may also be taken to include any collection of machines that individually or jointly execute instructions 624 to perform any one or more of the methodologies discussed herein.

The example computer system 600 includes one or more processors 602 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 600 may also include a memory 604 that store computer code including instructions 624 that may cause the processors 602 to perform certain actions when the instructions are executed, directly or indirectly by the processors 602. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 602 and reduces the space required for the memory 604. For example, the machine learning methods described herein reduces the complexity of the computation of the processors 602 by applying one or more novel techniques that simplify the steps in training, reaching convergence, and generating results of the processors 602. The algorithms described herein also reduces the size of the models and datasets to reduce the storage space requirement for memory 604.

The performance of certain of the operations may be distributed among the more than processors, not only residing within a single machine, but deployed across a number of machines. In some example embodiments, the one or more processors or processor-implemented engines may be located in a single geographic location (e.g., within a home environment, an office environment, or a server farm). In other example embodiments, the one or more processors or processor-implemented engines may be distributed across a number of geographic locations. Even though in the specification or the claims may refer some processes to be performed by a processor, this should be construed to include a joint operation of multiple distributed processors.

The computer system 600 may include a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The graphics display unit 610, controlled by the processors 602, displays a graphical user interface (GUI) to display one or more results and data generated by the processes described herein. The computer system 600 may also include alpha-numeric input device 612 (e.g., a keyboard), a cursor control device 614 (e.g., a mouse, a trackball, a joystick, a motion sensor, or other pointing instrument), a storage unit 616 (a hard drive, a solid state drive, a hybrid drive, a memory disk, etc.), a signal generation device 618 (e.g., a speaker), and a network interface device 620, which also are configured to communicate via the bus 608.

The storage unit 616 includes a computer-readable medium 622 on which is stored instructions 624 embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting computer-readable media. The instructions 624 may be transmitted or received over a network 626 via the network interface device 620.

While computer-readable medium 622 is shown in an example embodiment to be a single medium, the term "computer-readable medium" should be taken to include a single medium or multiple media (e.g., a centralized or distributed database, or associated caches and servers) able to store instructions (e.g., instructions 624). The computer-readable medium may include any medium that is capable of storing instructions (e.g., instructions 624) for execution by the processors (e.g., processors 602) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A method for searching genealogical records, the method comprising:
   receiving a user query that specifies one or more genealogical characteristics;
   performing searches on a plurality of genealogical databases with the genealogical characteristics, each search on a genealogical database returning a search result including one or more genealogical records identified according to the genealogical characteristics of the user query;
   combining the search results to generate a combined result including one or more of the genealogical records from the search results;
   ranking the genealogical records in the combined result using a machine learning model, the machine learning model trained to assign a weight to the search result returned from each of the genealogical databases, wherein the machine learning model is trained to assign a first weight to a first search result returned from a first genealogical record in a first user query that specifies a first genealogical characteristic and to assign a second weight different from the first weight to a second search result returned from the same first genealogical record in a second user query that specifies a second genealogical characteristic that is different from the first genealogical characteristic; and
   presenting a ranked combined result of genealogical records in response to the user query.

2. The method of claim 1, further comprising:
   determining one or more genealogical expanded characteristics derived from the genealogical characteristics specified in the user query, at least one of the genealogical characteristics being a string derived from a fuzzy operation of one of the genealogical characteristics specified in the user query,
   wherein the searches are performed with the genealogical characteristics and the genealogical expanded characteristics.

3. The method of claim 1, wherein the plurality of genealogical databases further comprises one or more of:
   a death record database, census record database, a court record database, a probate record database, and a DNA database.

4. The method of claim 1, wherein the machine learning model is trained with a training dataset, the training dataset comprising a plurality of historical search results, wherein each historical search result comprises a historical user query and historical user actions associated with the genealogical records found based on the historical user query.

5. The method of claim 1, wherein the machine learning model is associated with a performance function that is associated with a weighted linear combination of the plurality of databases.

6. The method of claim 1, wherein the machine learning model is trained by one or more gradient free algorithms.

7. The method of claim 6, wherein the gradient free algorithms include any combination of one or more of: a Nelder-Mead method, a coordinate ascent method, and a simulated annealing method.

8. A non-transitory computer-readable storage medium for searching genealogical records, the storage medium storing instructions that, when executed by a processor, cause the processor to perform operations comprising:
   receiving a user query that specifies one or more genealogical characteristics;
   determining one or more genealogical expanded characteristics derived from the genealogical characteristics specified in the user query, at least one of the genealogical characteristics being a string derived from a fuzzy operation of one of the genealogical characteristics specified in the user query;
   performing searches on a plurality of genealogical databases with the genealogical characteristics, each search on a genealogical database returning a search result including one or more genealogical records identified according to the genealogical characteristics of the user query, wherein the searches are performed with the genealogical characteristics and the genealogical expanded characteristics;
   combining the search results to generate a combined result including one or more the genealogical records from the search results;
   ranking the genealogical records in the combined result using a machine learning model, the machine learning model trained to assign a weight to the search result returned from each of the genealogical databases; and
   presenting a ranked combined result of genealogical records in response to the user query.

9. The storage medium of claim 8, wherein the machine learning model is associated with a performance function that is associated with a weighted linear combination of the plurality of databases.

10. The storage medium of claim 8, wherein the machine learning model is trained by any combination of one or more of: a Nelder-Mead method, a coordinate ascent method, and a simulated annealing method.

11. A computer system for searching genealogical records, comprising:
   one or more processors;
   one or more hardware storage devices having stored thereon computer-executable instructions that, when executed by the one or more processors, cause the computer system to perform at least the following:
      receive a user query that specifies one or more genealogical characteristics;
      determine one or more genealogical expanded characteristics derived from the genealogical characteristics specified in the user query, at least one of the genealogical characteristics being a string derived from a fuzzy operation of one of the genealogical characteristics specified in the user query;
      perform searches on a plurality of genealogical databases with the genealogical characteristics, each search on a genealogical database returning a search result including one or more genealogical records identified according to the genealogical characteristics of the user query, wherein the searches are performed with the genealogical characteristics and the genealogical expanded characteristics;
      combine the search results to generate a combined result including one or more of the genealogical records from the search results;
      rank the genealogical records in the combined result using a machine learning model, the machine learning model trained to assign a weight to the search result returned from each of the genealogical databases; and
      present a ranked combined result of genealogical records in response to the user query.

12. The computer system of claim 11, wherein the plurality of genealogical databases further comprises at least one of:
   a death record database, census record database, a court record database, a probate record database, and a DNA database.

13. The computer system of claim 11, wherein the machine learning model is trained to assign a first weight to a first search result returned from a first genealogical record in a first user query that specifies a first genealogical characteristic and to assign a second weight different from the first weight to a second search result returned from the same first genealogical record in a second user query that specifies a second genealogical characteristic that is different from the first genealogical characteristic.

14. The computer system of claim 11, wherein the machine learning model is trained with a training dataset, the training dataset comprising a plurality of historical search results, wherein each historical search result comprises a historical user query and historical user actions associated with the genealogical records found based on the historical user query.

15. The computer system of claim 11, wherein the machine learning model is associated with a performance function that is associated with a weighted linear combination of the plurality of databases.

16. The computer system of claim 11, wherein the machine learning model is trained by one or more gradient free algorithms.

17. The computer system of claim 16, wherein the gradient free algorithms include any combination of one or more of: a Nelder-Mead method, a coordinate ascent method, and a simulated annealing method.

* * * * *